United States Patent [19]

Jennings

[11] Patent Number: 4,856,594
[45] Date of Patent: Aug. 15, 1989

[54] WELLHEAD CONNECTOR LOCKING DEVICE

[75] Inventor: Charles E. Jennings, Houston, Tex.

[73] Assignee: Vetco Gray Inc., Houston, Tex.

[21] Appl. No.: 237,585

[22] Filed: Aug. 26, 1988

[51] Int. Cl.[4] .................... E21B 33/038; F16L 55/00
[52] U.S. Cl. .................... 166/338; 166/340; 166/345; 285/18; 285/315
[58] Field of Search .............. 166/338, 340, 344, 345, 166/368, 86, 88; 285/18, 315, 920, 138, 141

[56] References Cited

U.S. PATENT DOCUMENTS

| | | | |
|---|---|---|---|
| 3,321,217 | 5/1967 | Ahlstone | 166/338 X |
| 4,441,740 | 4/1984 | Cowan et al. | 285/18 |
| 4,441,741 | 4/1984 | Galle, Jr. | 285/18 |
| 4,491,345 | 1/1985 | Regan | 285/18 |
| 4,491,346 | 1/1985 | Walker | 285/18 |
| 4,619,324 | 10/1986 | Couch | 166/344 |

Primary Examiner—Stephen J. Novosad
Attorney, Agent, or Firm—James E. Bradley

[57] ABSTRACT

A wellhead connector for connecting a riser to a wellhead in a subsea well remains connected even though hydraulic pressure is removed. The wellhead connector has a housing which slides over the wellhead, and dogs are carried by the housing for radial movement into engagement with grooves formed on the exterior of the wellhead. An axially moveable cam ring moves downward to push the dogs radially inward to a locked position. A wedge ring is carried on the inner side of the cam ring. The wedge ring locates between the dogs and the cam ring. The wedge ring has sides that are conical and converge in a downward direction. The wedge ring locks the cam ring in a lower position. A release ring carried by a piston shaft will move the wedge ring upward relative to the cam ring when the piston shaft is moving to the released position, to release the cam ring.

5 Claims, 2 Drawing Sheets

WELLHEAD CONNECTOR LOCKING DEVICE

BACKGROUND OF THE INVENTION

1. Field of the Invention:

This invention relates in general to subsea wells, and in particular to a connector for connecting a riser to a subsea wellhead housing.

2. Description of the Prior Art:

In a subsea well of the type concerned herein, a wellhead is located on the sea floor. The wellhead is a tubular member. A riser extends from a vessel at the surface to the wellhead. A wellhead connector connects the lower end of the riser to the wellhead.

The wellhead connector has a housing which slides over the wellhead. In one type, a plurality of dogs are carried by the connector. A cam ring moves the dogs radially inward into engagement with grooves formed on the exterior of the wellhead. A piston moves the cam ring axially between open and closed positions.

Because of wave movement and currents, the riser will have some movement. This movement is transmitted to the wellhead connector and may tend to cause the wellhead connector to loosen its connection with the wellhead.

SUMMARY OF THE INVENTION

The wellhead connector of this invention has a wedge ring that locates between the cam ring and the dogs. The wedge ring is tapered on both its inner and outer sides. The tapered sides converge toward each other in a downward direction. These tapered sides mate with tapered sides on the cam ring and the wedge ring. The wedge ring prevents the cam ring from moving upward and loosening its engagement with the dogs, because the upward movement tends to further wedge the cam ring in place.

A release ring is carried below the cam ring. The piston shaft which actuates the cam ring will move the release ring upward a slight distance relative to the cam ring when releasing the cam ring. This upward movement causes the release ring to contact the wedge ring and push it upward to release its wedging engagement.

DETAILED DESCRIPTION OF THE INVENTION

Figure 1:
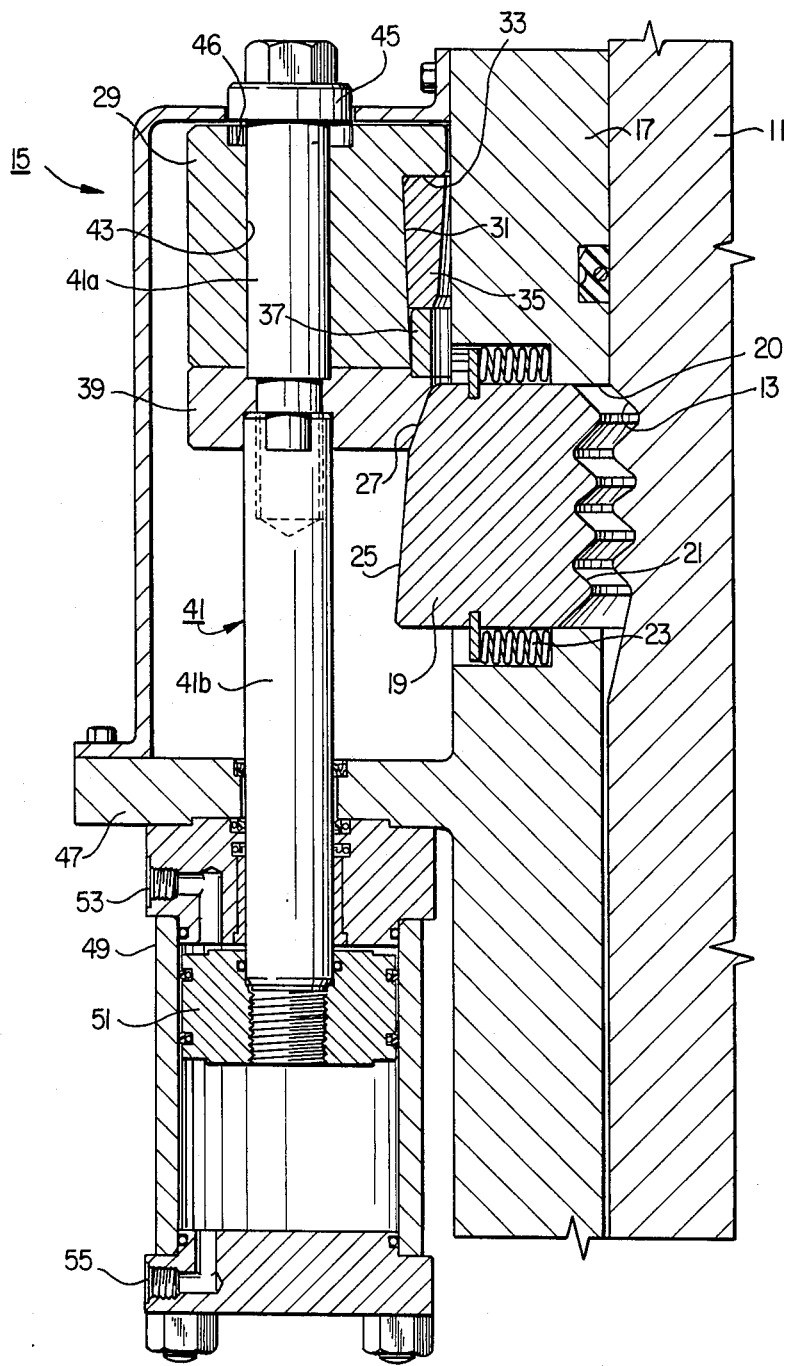
FIG. 1 is partial vertical sectional view illustrating a wellhead connector constructed in accordance with this invention.

Referring to FIG. 1, wellhead 11 is a tubular member located vertically on the sea floor. A plurality of circumferential grooves 13 are formed on the exterior of the wellhead 11 to provide a locking profile. A wellhead connector 15 is connected to the lower end of a string of risers (not shown) which extends from a vessel at the surface.

The wellhead connector 15 includes a tubular housing 17. Housing 17 has an inner diameter that is slightly greater than the outer diameter of the wellhead 11. The housing 17 will slide over the wellhead 11 as the wellhead connector 15 is lowered into place. A plurality of dogs 19 are carried in apertures 20 in the wellhead connector 15. The dogs 19 will move between the retracted position shown in FIG. 1 to a locked position shown in FIG. 2. Springs 23 urge the dogs 19 outward to the retracted position.

Each dog 19 has an outer side 25 that is inclined. That is, the outer side 25 is a straight conical surface with a wider base at the bottom than at the upper end. It inclines radially outward in a downward direction. A beveled edge 27 is located at the upper end of the outer side 25 of each dog 19. The inclination of each outer side 25 is about four degrees relative to vertical.

A cam ring 29 is reciprocally carried by the housing 17. The cam ring 29 is a solid annular member located on the exterior of the housing 17. Cam ring 29 has an inner side 31 that is a frusto-conical surface. The inner side 31 is inclined or tapered relative to the vertical axis of the wellhead connector 15. The inclination is radially inward in a downward direction, opposite to the inclination on the outer sides 25 of dogs 19. The upper end of the inner side 31 has a greater diameter than the lower end or base of the inner side 31. The degree of inclination is preferably about two degrees relative to vertical.

A shoulder 33 is located at the upper end of the cam ring 29 above the inclined inner side 31. Shoulder 33 extends radially inward. The lower side of shoulder 33 is perpendicular to the axis of the wellhead connector 15.

Figure 2:
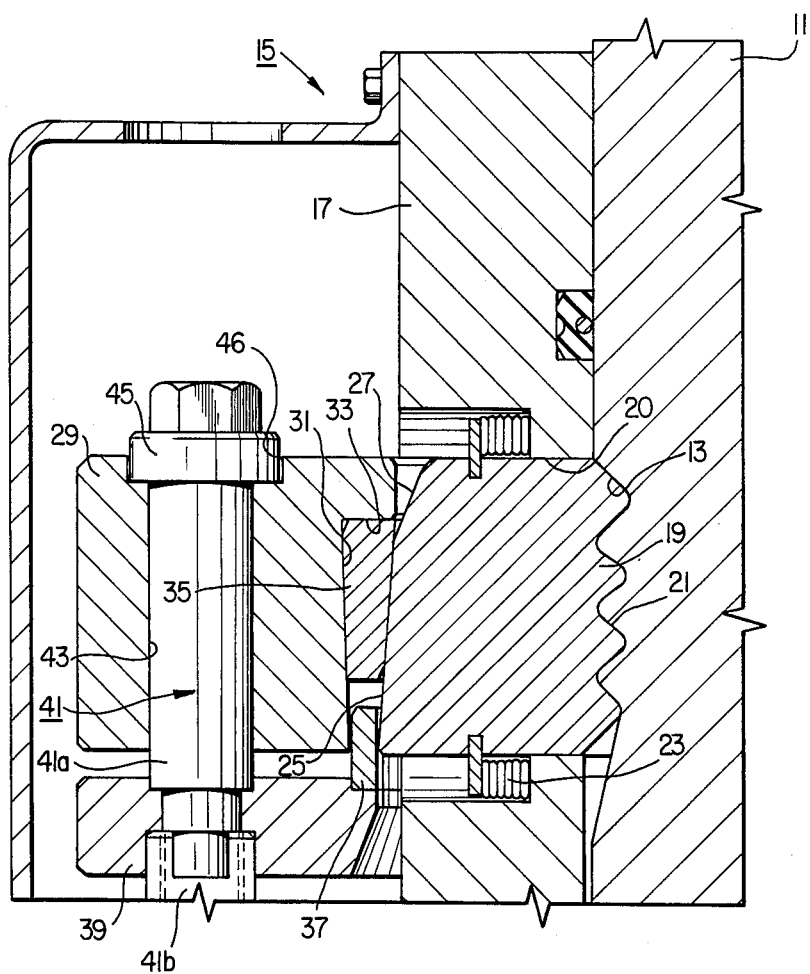
FIG. 2 is an enlarged view of a portion of the wellhead connector of FIG. 1, showing the connector in a locked position.

A wedge ring 35 is carried on the inner side 31 of the cam ring 29. The wedge ring 35 is a split annular metal ring. It will contract and expand radially. Wedge ring 35 is tapered both on its inner and outer sides. The upper end of the wedge ring 35 is of greater radial thickness than the lower end. The degrees of taper of the inner and outer sides of the wedge ring 35 is the same as the degrees of taper of the dogs' outer sides 25 and the cam ring inner side 31, respectively. The wedge ring 35 will thus mate with the dogs' outer sides 25 and the cam ring inner side 31, as shown in FIG. 2. The inclinations of the wedge ring 35 inner and outer sides are locking tapers. That is, a greater force is required to move the wedge ring 35 up relative to the dogs 19 than down after the wedge ring 35 and dogs' outer sides 25 have been engaged for a period of time.

The friction resultant or friction angle between the wedge ring 35 and the outer sides 25 of dogs 19 is selected to be greater than the friction resultant between the wedge ring 35 and the inner side 31 of the cam ring 29. The friction resultant depends on the surface finishes and the inclination of the mating surfaces. Preferably, the surface finishes on the inner side of the wedge ring 35 and the dogs' outer sides 25 are roughened to provide selected static coefficients of friction. Preferably, the surface finishes on the outer side of the wedge ring 35 and the cam ring inner side 31 are polished or coated smooth to provide lesser coefficients of friction than the coefficients of friction of the inner side of the wedge ring 35 and the dogs' outer sides 25.

If an upward force is applied to the cam ring 29, the cam ring 29 will slide upward relative to the wedge ring 35 rather than the wedge ring 35 sliding upward on the outer sides 25 of the dogs 19. This result is due to the lesser degree of inclination on the cam ring inner side 31 and to the lesser coefficients of friction of the outer side of the wedge ring 35 and the cam ring inner side 31. The upward movement of the cam ring 29 relative to the wedge ring 35 results in a horizontal force component which causes the wedge ring to further wedge the cam ring 29 and the dogs 19 in place.

A release ring 37 is located below the wedge ring 35. Release ring 37 is a solid metal ring with cylindrical inner and outer sides. The radial thickness of the release ring 37 is less than the radial thickness of the wedge ring 35 at the bottom of the wedge ring 35. The release ring 37 is supported by a collar 39. The collar 39 is rigidly mounted to a piston shaft 41. Collar 39 fits under the cam ring 29. Collar 39 has a bevelled inner side that mates with the bevelled edge 27 on the outer sides 25 of the dogs 19.

A plurality of piston shafts 41 are spaced apart from each other circumferentially around the wellhead connector housing 17. Each piston shaft 41 has an upper portion 41a that extends slidingly through a passage 43 in the cam ring 29 and a lower portion 41b. The upper and lower portions 41a, 41b are screwed together in the collar 39 so as to rigidly connect the collar 39 with the shaft 41. A washer 45 is rigidly attached to the upper end of each shaft 41. The washer 45 locates in a counterbore 46 formed at the upper end of each passage 43. This allows the shaft 41 and collar 39 to move up and down a slight amount relative to the cam ring 29, as can be seen by comparing FIG. 1 and FIG. 2.

The lower portion 41b of shaft 41 extends slidingly through a flange 47 formed on the exterior of the wellhead connector housing 17. The lower portion 41b extends into a hydraulic cylinder 49. A piston 51 is carried reciprocally in the hydraulic cylinder 49. An upper port 53 provides access to hydraulic fluid on the upper side of the piston 51. A lower port 55 provides access to hydraulic fluid on the lower side of the piston 51.

In operation, the wellhead connector 15 will be lowered over the wellhead 11 until reaching the position shown in FIG. 1. Initially, the dogs 19 will be in the retracted position. The cam ring 29 and the piston 51 will be in an upper position. The collar 39 will support the cam ring 29 in the upper position. The release ring 37 will support the wedge ring 35 in the upper position.

Then hydraulic fluid is supplied to the upper port 53. Piston 51 will move downward and will bring along with it the collar 39. The collar 39 will initially start the dogs 19 moving inward by the engagement with the beveled edge 27. The shaft 41 will continue downward movement with the piston 51 until the washer 45 bears against the top of the cam ring 29. The cam ring 29 will also move downward. This will cause the wedge ring 35 to expand as it slides against the outer sides 25 of the dogs 19. The dogs 19 will move radially inward to the locked position shown in FIG. 2.

Once the wedge ring 35 reaches a locking position, the cam ring 29 will also stop downward movement due to contact of the cam ring shoulder 33 at the top of the wedge ring 35. The shoulder 33 thus serves as a stop means for preventing farther downward movement of the cam ring 29 once a sufficient amount of force has been reached. The hydraulic pressure will increase, and a control mechanism (not shown) will release the hydraulic fluid flow through the port 53.

Even though the hydraulic fluid pressure acting on the piston 51 has been released, the locking tapers of the wedge ring 35 will prevent substantial upward movement of the cam ring 29. Some slight upward movement can occur if there is substantial movement of the riser string due to wave or current motion. If so, the shaft 41 and the cam ring 29 would move slightly upward relative to the wedge ring 35. However, this upward movement will be strongly resisted by the wedge ring 35, which will wedge more tightly. There will not be enough upward movement of the cam ring 29 relative to the wedge ring 35 to cause the release ring 37 to contact the wedge ring 35.

When it is desired to release the wellhead connector, hydraulic fluid pressure is supplied to the lower port 55. This causes the piston 51 to begin moving upward. The release ring 37 will move upward with the shaft 41 and collar 39 a slight distance while the cam ring 29 remains stationary and locked in place. The release ring 37 will contact the lower side of the wedge ring 35 and begin to move it upward. The upward movement of the wedge ring 35 relative to the dogs 19 and cam ring 29 releases the locking wedging action. The cam ring 29 is then free to move back to the upper position as shown in FIG. 1. The springs 23 will cause the dogs 19 to move to the outer retracted positions.

The invention has significant advantages. The wedge ring with its tapered sides locks the cam ring in place to hold the dogs in the engaged position.

While the invention has been shown in only one of its forms, it should be apparent to those skilled in the art that it is not so limited but is susceptible to various changes without departing from the scope of the invention.

I claim:

1. In a connector for connecting a conduit to a tubular member, the connector having a housing which slides over the tubular member, a plurality of dogs carried by the housing for radial movement into engagement with a set of grooves formed on the exterior of the tubular member, an axially movable cam ring movable between an unlocked and a locked position for moving the dogs radially inward, and piston means for moving the cam ring between the unlocked and locked positions, the improvement comprising:

a wedge ring having an inner side that engages an outer side of each of the dogs when the cam ring is in the locked position, the wedge ring having an outer side that engages an inner side of the cam ring;

the inner side of the cam ring and the outer sides of the dogs each inclining relative to a longitudinal axis of the tubular member, the inner side of the cam ring converging toward the outer sides of the dogs; and the inner and outer sides of the wedge ring inclining relative to the longitudinal axis of the tubular member and converging toward each other for wedging the cam ring in the locked position.

2. In a connector for connecting a conduit to a tubular member, the connector having a housing which slides over the tubular member, a plurality of dogs carried by the housing for radial movement into engagement with a set of grooves formed on the exterior of the tubular member, an axially movable cam ring movable between an unlocked and a locked position for moving the dogs radially inward, and piston means for moving the cam ring between the unlocked and locked positions, the improvement comprising:

a split wedge ring carried by the cam ring, the wedge ring having an inner side that slidingly engages an outer side of each of the dogs as the cam ring moves to the locked position and an outer side that slidingly engages an inner side of the cam ring as the cam ring starts to move from the locked position toward the unlocked position;

the inner side of the cam ring and the outer sides of the dogs each inclining relative to a longitudinal axis of the tubular member, the inner side of the cam ring converging toward the outer sides of the dogs;

the inner and outer sides of the wedge ring inclining relative to the longitudinal axis of the tubular member and converging toward each other for wedging the cam ring in the locked position; and release means for moving the wedge ring relative to the cam ring and dogs in a direction opposite of the direction of convergence of the inner and outer sides of the wedge ring in order to allow the piston means to move the cam ring back to the unlocked position.

3. In a connector for connecting a conduit to a tubular member, the connector having a housing which slides downward over the tubular member, a plurality of dogs carried by the housing for radial movement into engagement with a set of grooves formed on the exterior of the tubular member, an axially movable cam ring movable downward from an unlocked and a locked position for moving the dogs radially inward, the improvement comprising:

a tapered inner side on the cam ring that inclines radially inward in a downward direction;

a tapered outer side formed on the dogs that inclines radially outward in a downward direction;

a split wedge ring carried by the cam ring, the wedge ring having a tapered outer side that slidingly mates with the inner side of the cam ring, the wedge ring having a tapered inner side that slidingly expands against the outer sides of the dogs as the cam ring moves downward;

stop means on the cam ring for moving the wedge ring downward with the cam ring as the wedge ring engages the outer sides of the dogs;

piston means for moving the cam ring between the unlocked and locked positions, including a shaft extending from a piston into engagement with the cam ring; and a release ring carried by the shaft directly below the wedge ring, the shaft being vertically movable a limited amount relative to the cam ring, so that upward movement of the shaft lifts the release ring relative to the cam ring to push the wedge ring upward to allow the cam ring to move back up to the unlocked position.

4. In a connector for connecting a conduit to a tubular member, the connector having a housing which slides over the tubular member, a plurality of dogs carried by the housing for radial movement into engagement with a set of grooves formed on the exterior of the tubular member, an axially movable cam ring movable between an unlocked and a locked position for moving the dogs radially inward, and piston means for moving the cam ring between the unlocked and locked positions, the improvement comprising:

a split wedge ring having an inner side that engages an outer side of each of the dogs when the cam ring is in the locked position and an outer side that engages an inner side of the cam ring;

the inner side of the cam ring and the outer sides of the dogs each inclining relative to a longitudinal axis of the tubular member, the inner side of the cam ring converging toward the outer sides of the dogs; and the inner side of the wedge ring and the outer sides of the dogs having a greater friction resultant between them than the outer side of the wedge ring and the inner side of the cam ring, so that any upward movement of the connector causes the cam ring to move upward relative to the wedge ring as the wedge ring remains stationary relative to the dogs, further wedging the cam ring in place.

5. In a connector for connecting a conduit to a tubular member, the connector having a housing which slides over the tubular member, a plurality of dogs carried by the housing for radial movement into engagement with a set of grooves formed on the exterior of the tubular member, an axially movable cam ring movable between an unlocked and a locked position for moving the dogs radially inward, and piston means for moving the cam ring between the unlocked and locked positions, the improvement comprising:

a split wedge ring having an inner side that engages an outer side of the dogs when the cam ring is in the locked position and an outer side that engages an inner side of the cam ring, the inner side and outer sides of the wedge ring each inclining relative to a longitudinal axis of the tubular member and converging toward each other, the angle of inclination of the inner side of the wedge ring being more than the outer side, so that any upward movement of the connector causes the cam ring to move upward relative to the wedge ring as the wedge ring remains stationary relative to the dogs, further wedging the cam ring in place.

* * * * *